(12) United States Patent
Han

(10) Patent No.: US 8,571,572 B2
(45) Date of Patent: Oct. 29, 2013

(54) SYSTEM AND METHOD FOR PROVIDING FRIEND'S LOCATION INFORMATION

(75) Inventor: Jong Kook Han, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 753 days.

(21) Appl. No.: 12/514,700

(22) PCT Filed: Sep. 20, 2007

(86) PCT No.: PCT/KR2007/004620
§ 371 (c)(1),
(2), (4) Date: May 13, 2009

(87) PCT Pub. No.: WO2008/060036
PCT Pub. Date: May 22, 2008

(65) Prior Publication Data
US 2010/0062794 A1    Mar. 11, 2010

(30) Foreign Application Priority Data
Nov. 14, 2006 (KR) .................. 10-2006-0112110

(51) Int. Cl.
*H04W 24/00* (2009.01)
*H04W 4/00* (2009.01)
*H04M 1/56* (2006.01)

(52) U.S. Cl.
USPC ............... 455/456.1; 455/456.6; 455/457; 455/461; 379/142.1

(58) Field of Classification Search
USPC ................................ 455/404.2, 456.1–457
See application file for complete search history.

(56) References Cited

U.S. PATENT DOCUMENTS

| | | | |
|---|---|---|---|
| 6,486,801 B1 | 11/2002 | Jones | |
| 7,565,155 B2 * | 7/2009 | Sheha et al. | 455/456.1 |
| 2002/0028684 A1 * | 3/2002 | Kuwahra et al. | 455/456 |
| 2002/0086683 A1 * | 7/2002 | Kohar et al. | 455/456 |
| 2003/0016804 A1 | 1/2003 | Sheha et al. | |
| 2006/0252431 A1 * | 11/2006 | Mullen | 455/456.1 |
| 2006/0276201 A1 | 12/2006 | Dupray | |
| 2007/0178915 A1 * | 8/2007 | Khan | 455/457 |

FOREIGN PATENT DOCUMENTS

| | | |
|---|---|---|
| JP | 09-215041 | 8/1997 |
| KR | 10-2001-0105651 | 11/2001 |
| KR | 10-2002-0065205 | 8/2002 |
| KR | 10-2002-0081643 | 10/2002 |

OTHER PUBLICATIONS

International Search Report for PCT/KR2007/004620 mailed Dec. 17, 2007.
Written Opinion for PCT/KR2007/004620 mailed Dec. 17, 2007.
Australian Office Action issued by the Australian Patent Office on May 21, 2010 for the corresponding Australian Patent Application No. 2007320301.

* cited by examiner

*Primary Examiner* — Huy C Ho
(74) *Attorney, Agent, or Firm* — Nixon & Vanderhye, PC

(57) ABSTRACT

A system and method of providing friend location information is provided. More particularly, when a friend appears in a region desired by a user, it is possible to track a travel route of the friend and display for the user a map where the travel route is marked and thereby enable the user to understand preferred places of the friend.

14 Claims, 5 Drawing Sheets

SYSTEM AND METHOD FOR PROVIDING
FRIEND'S LOCATION INFORMATION

This application is the U.S. national phase of International Application No. PCT/KR2007/004620, filed 20 Sep. 2007, which designated the U.S. and claims priority to Korean Application No. 10-2006-00112110, filed 14 Nov. 2006, the entire contents of each of which are hereby incorporated by reference.

TECHNICAL FIELD

The present invention relates to a system for providing friend location information, and more particularly, to a method and system for providing a user with information about a location of a friend so that the user may identify preferred places of the friend.

BACKGROUND ART

Currently, as the number of users carrying mobile phones increases, services for providing information about another person's location using mobile phones are also increasing. In the past years, it was very difficult to identify a particular person's location without using a separate device. However, since a base station that transmits and receives data with a mobile phone can readily identify a location of a user carrying the mobile phone, such services are becoming more popular. Therefore, mobile communication service providers provide services which provide user location information and location information of another user enrolled by the user.

However, the services only enable the user to simply identify a location of the user itself, and thereby receive proximity location information or verify location information of the other user enrolled by the user, based on the identified user location information. Therefore, the user is able to identify where the other user is located at a current point in time, whereas it is very difficult to identify which route the other user is moving along in a particular region.

As described above, conventional services do not provide information about which route the other user is moving in the particular region. Therefore, the user should frequently verify location information of the other user and mark the verified location information on a separate map or remember the location information. Also, the information about which route the other user is moving along in the particular region may include information about what type of places the other user prefers. Therefore, it will be useful information for the user who desires to understand preferred places of the friend.

Accordingly, the present invention provides a method and system for providing friend location information which can provide a user with a map where a travel route of a friend is marked, based on location information of the friend selected by the user, and thereby enables the user to identify the travel route of the friend at a glance using the marked map and verify favored places of the friend.

DISCLOSURE OF INVENTION

Technical Goals

An objective of the present invention is to provide a user with friend location information.

Another objective of the present invention is to enable a user to identify preferred places of a friend.

Another objective of the present invention is to provide a user with a map where a travel route of a friend is marked and thereby enable the user to identify the travel route of the friend at a glance.

Another objective of the present invention is to inform a user that a friend is approaching the user so that the user may verify the approach of the friend in real time.

Another objective of the present invention is to provide a user with a distance between the user and a friend so that the user may readily identify a location of the friend.

Technical Solutions

According to an aspect of the present invention, there is provided a system for providing friend location information, the system including: a friend information receiving unit configured to receive from a user a mobile phone number of a friend; a region selection unit configured to receive from the user a selection of a region to verify a travel route of the friend; a location information receiving unit configured to receive the friend location information based on the mobile phone number of the friend; a location information storage unit configured to store in a database the travel route of the friend in the region when a location of the friend is included in the region; and a location information provider configured to provide the user with a map of the region by referring to the database, wherein the map of the region includes the travel route of the friend.

According to another aspect of the present invention, there is provided a method of providing friend location information, the method including: receiving from a user a mobile phone number of a friend; receiving from the user a selection of a region to verify a travel route of the friend; receiving the friend location information based on the mobile phone number of the friend; storing in a database the travel route of the friend in the region when a location of the friend is included in the region; and providing the user with a map of the region by referring to the database wherein the map of the region includes the travel route of the friend.

The term 'friend' used throughout the present specification does not mean a lexical friend, but is used to denote another party that a user is interested in and desires to obtain information from. Therefore, in the case of interpreting the claims, the scope of the present invention should not be limited to or restricted by the term 'friend'.

BEST MODE FOR CARRYING OUT THE INVENTION

Figure 1:
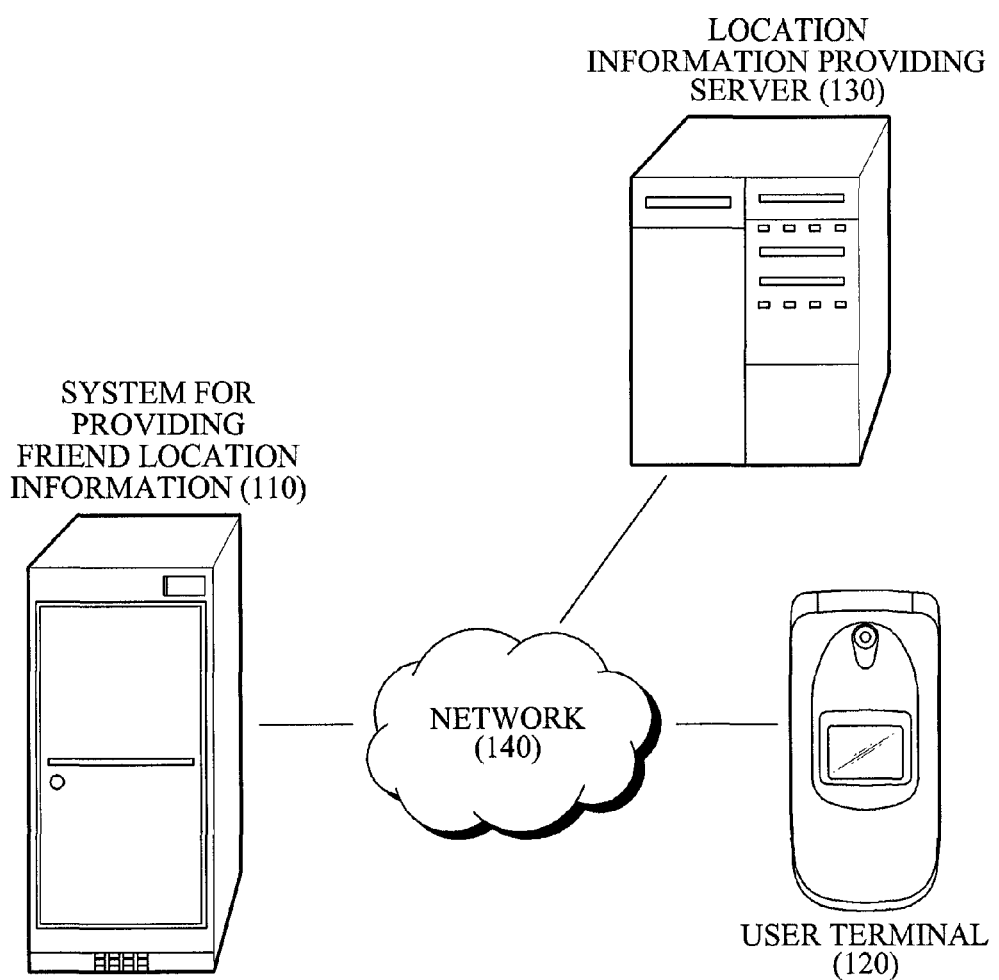
FIG. 1 is a diagram illustrating a network configuration of a system for providing friend location information according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a network configuration of a system 110 for providing friend location information according to an exemplary embodiment of the present invention.

As shown in FIG. 1, the system 110 is connected with a user terminal 120 and a location information providing server 130 via a network 140. The system 110 may include a network interface capable of accessing the Internet for the connections. Also, the system 110 may be constructed in a form of a web server that provides wired or wireless Internet services. Also, the system 110 may be connected with a separate web server and provide information for services. In the present invention, when the separate web server directly provides services to the user terminal 120 via a wired or wireless network, the system 110 may be understood as a concept to include the web server.

The user terminal 120 receives services from the system 110 and may be, for example, a mobile phone terminal as shown in the figures. Also, depending on circumstances, the user terminal 120 may adopt a computer terminal, a personal digital assistant (PDA), and the like. Also, the user terminal 120 may include a wireless network interface capable of transmitting and receiving multimedia data in order to receive services such as providing of a map, transmitting of a message, and the like.

The location information providing server 130 denotes an apparatus which can verify user location information of a user or location information of a friend enrolled by the user. Generally, a location of a mobile phone can be readily identified based on a location of a base station which transmits and receives data with the mobile phone. Also, the location of the base station can be readily verified by a mobile communication provider that provides mobile phone services. According to the present invention, providing of location information of the user is required for the system 110 to determine friend location information. Therefore, the location information may be received from the location information providing system 130. In this instance, the location information providing server 130 may identify the location of the user based on the location of the base station and also identify a current location of the mobile phone by using various types of identification schemes. However, the present invention is not limited thereto. Specifically, the present invention may be implemented irrespective of a specific location identification scheme and the scope of the present invention is not restricted thereby.

The network 140 denotes a communication network capable of being connected with the Internet and the like. The system 110 may be connected with the user terminal 120 and the location information providing server 130 via the same network, or via different networks. Generally, the user terminal 120 is a mobile phone. In this case, the network 140 may be a wireless Internet network which is connectable with the mobile phone. The system 110 and the location information providing server 130 may be connected with each other via a separate wired Internet network. In this instance, the present invention is not limited to the above network construction.

Figure 2:
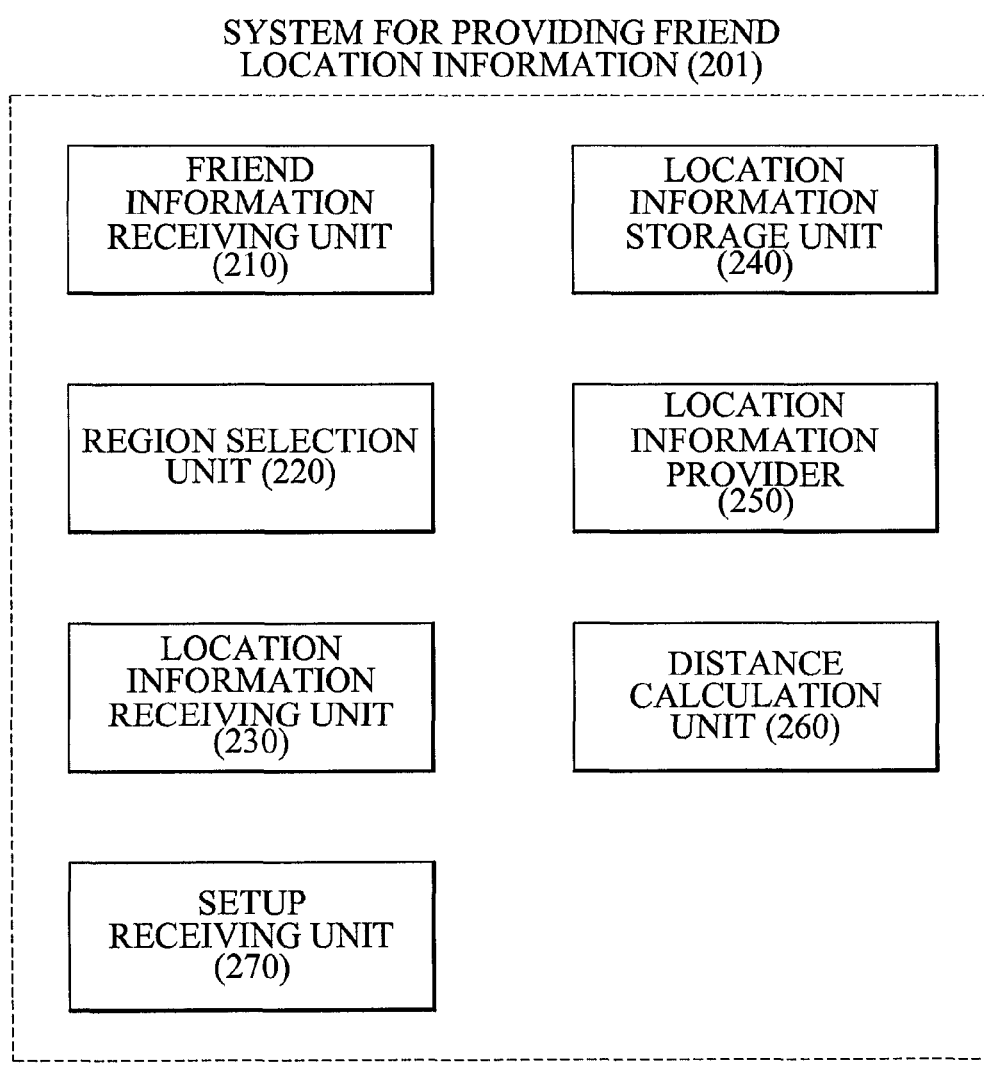
FIG. 2 is a block diagram illustrating an internal configuration of a system for providing friend location information according to an exemplary embodiment of the preset invention.

FIG. 2 is a block diagram illustrating an internal configuration of a system 201 for providing friend location information according to an exemplary embodiment of the preset invention.

As shown in FIG. 2, the system 201 includes a friend information receiving unit 210, a region selection unit 220, a location information receiving unit 230, a location information storage unit 240, a location information provider 250, a distance calculation unit 260, and a setup receiving unit 270. The components may be embodied into a form of software, hardware, or combination of software and hardware. Also, the components may be connected with each other. Hereinafter, each of the components will be described.

The friend information receiving unit 210 receives from a user a mobile phone number of a friend. The mobile phone number may be directly input from the user via a user terminal. Also, the mobile phone number may be input from the user by selecting a friend from friends that the user enrolled in the system 201 using an address book and the like. When the user directly selects and inputs the friend, an enrolled mobile phone number of the friend may be input as the mobile phone number of the friend. A location of the friend may be identified based on a location of the mobile phone of the friend. Therefore, the mobile phone number may be required to identify the location of the friend.

The region selection unit 220 receives from the user a selection of a region to verify a travel route of the friend. The selected region may be a particular region which is included within a predetermined distance, or may be places where many people visit, for example, Kangnam, Myungdong, and the like. Also, any region can be selected depending on the user's necessity. In this instance, the user may input a name of the region and select the region from a provided list according to the name, or may select the region which the user is interested in while viewing a map and changing a view point of the map. Also, the user may select the region using various types of schemes. Any type of scheme enabling the user to select the region which the user is interested in may be applicable to the present invention.

The location information receiving unit 230 receives location information of the friend based on the mobile phone number of the friend. The location information may be received from a separate location information providing server. Generally, the location of the mobile phone may be readily identified by the base station which transmits and receives data with the mobile phone. Therefore, the location information providing server may be a server of a mobile communication provider that operates the base station. Also, any type of scheme capable of identifying the location of the mobile phone and thereby enabling the user to identify a current location of the friend may be applicable to the present invention. The location information receiving unit 230 may receive location information of the friend and provide the user with friend location information based on the received location information.

Also, the friend location information received from the location information receiving unit 230 may include various types of information, that is, any type of information that helps the user to accurately identify the location of the friend.

The location information receiving unit 230 may receive information about the location of the friend enrolled by the user and also receive information about the location of the user. When the user location information is received, it is possible to verify how proximate to the user the friend is. Based on this, it is possible to provide information regarding whether the friend is approaching the user or whether the friend is becoming separated from the user.

When the location of the friend, received from the location information receiving unit 230, is included in the region selected from the region selection unit 220, the location information storage unit 240 stores in a database the travel route of the friend in the selected region. The system 201 according to the present exemplary embodiment may enable the user to identify the travel route of the friend at a glance even though the user does not frequently verify the location of the friend using a mobile phone. In this instance, when the current location of the enrolled friend is displayed for the user and simply deleted, the service becomes unusable.

Accordingly, the location information storage unit 240 stores in the database location information of the friend enrolled by the user, so that the user may later identify the travel route of the enrolled friend at a glance, when the user desires. The information received from the location information receiving unit 230 may be stored as the location information of the friend as is. Also, the received information may be processed to be stored as the location information of the friend.

Also, the database of the location information storage unit 240 that stores the location information of the friend may include a database management system (DBMS) such as Oracle, MySQL, DB2, and the like, and also may include all the storage devices capable of storing data or all the programs capable of storing and managing the data in the storage devices.

Also, the location information storage unit 240 may store the location of the friend in the database only when the friend is in close proximity to the user. Whether the friend is in close proximity to the user may be measured based on a distance between the current location of the user and the current location of the friend. The distance may be calculated and received from the distance calculation unit 260 which will be described later. Also, it is possible to receive from the user, information about whether to store location information of the friend when the friend is within a predetermined distance from the user. Therefore, when the friend is in close proximity to the user, it is possible to provide the user with more effective information by enabling the user to identify the travel route of the friend.

Also, depending on a setup of the user, the location information storage unit 240 may store the location of the friend in the database only when the friend is becoming separated from the user. In this case, the distance between the user and the friend may be calculated based on the current location of the user and the current location of the friend and the location of the friend may be stored only when the distance is greater than or equal to a predetermined value. Therefore, even when the friend is becoming separated from the user, the user may identify which route the friend is traveling along.

The location information provider 250 provides the user with a map of the region by referring to the database. The map of the region includes the travel route of the friend and the database stores location information of the friend. The map including the travel route of the friend may be displayed on a user terminal in a visually identifiable form.

In order to provide the user with the map that includes the travel route of the friend, the location information provider 250 should first receive location information of the friend from the database storing the same. The database stores information about locations where the friend was located in the region set by the user, and thus the user may verify which route the friend traveled along based on the information. Also, in order to enable the user to more readily verify the identified travel route of the friend, the location information provider 250 may mark the travel route of the friend on the map of the selected region using an arrow and the like, and display the marked map for the user. As described above, when the user views the map marked by an arrow, the user may identify which route the friend traveled along at a glance.

Accordingly, the location information provider 250 may receive a map image selected from the region selection unit 220, include location information of the friend, which is extracted from the database, in the received map image, and thereby provide the travel route of the friend. For the above operation, the map image may include location information corresponding to a location of an actual region. For example, information about the location of the actual region may be stored in each pixel of the image or some range of the image.

Also, the location information provider 250 may display current location information of the friend for the user. In this instance, when displaying the map where the travel route of the friend is marked, the location information provider 250 may also display the current location of the friend on the map for the user. Also, the location information provider 250 may display for the user an address of the current location of the friend in a form of a text message. When the current location information of the friend is provided in the form of the text message, the location information provider 250 may provide the current location information using a short message service (SMS) message of the mobile phone terminal.

When the distance between the user and the friend is calculated by the distance calculation unit 260, the location information provider 250 may provide various types of information using the distance. The location information provider 250 may directly provide the user with the calculated distance. In this case, the user may receive information about the calculated distance and verify how far away the friend is from the current location of the user.

Also, when an approach notification and an approach distance is received from the user, the location information provider 250 may inform the user of an approach of the friend when the friend has approached the user to be within a distance less than the approach distance. The approach notification may be transmitted in real time using an SMS message of the mobile phone. Also, when the friend is in close proximity to the user, within the distance less than the approach distance, and then starts becoming separated from the user, the location information provider 250 may transmit an SMS message to the user to inform of the separation of the friend from the user.

Also, when a separation notification and a separation distance is received from the user, and in this instance, the friend is becoming separated from the user at a distance greater than or equal to the separation distance, the location information provider 250 may inform the user of the separation of the friend from the user. The separation notification may be transmitted to the user using an SMS message of the mobile phone.

The distance calculation unit 260 calculates the distance between the friend and the user by referring to friend location information and user location information received from the location information receiving unit 230. When the location of the friend and the location of the user are identified, a general distance calculation scheme may be readily used to calculate the distance between the friend and the user. Any type of calculation schemes may be applicable to the present invention.

The setup receiving unit 270 receives an approach notification setup from the user. When the approach notification setup is received and thereby approach notification is set, the location information provider 250 informs the user of an approach of the friend when the distance between the user and the friend is within a predetermined distance. Also, the setup receiving unit 270 may receive a separation notification setup. In this case, when the friend is becoming separated from the user to be beyond the predetermined distance, the location information provider 250 may inform the user of the separation of the friend from the user.

Figure 3:
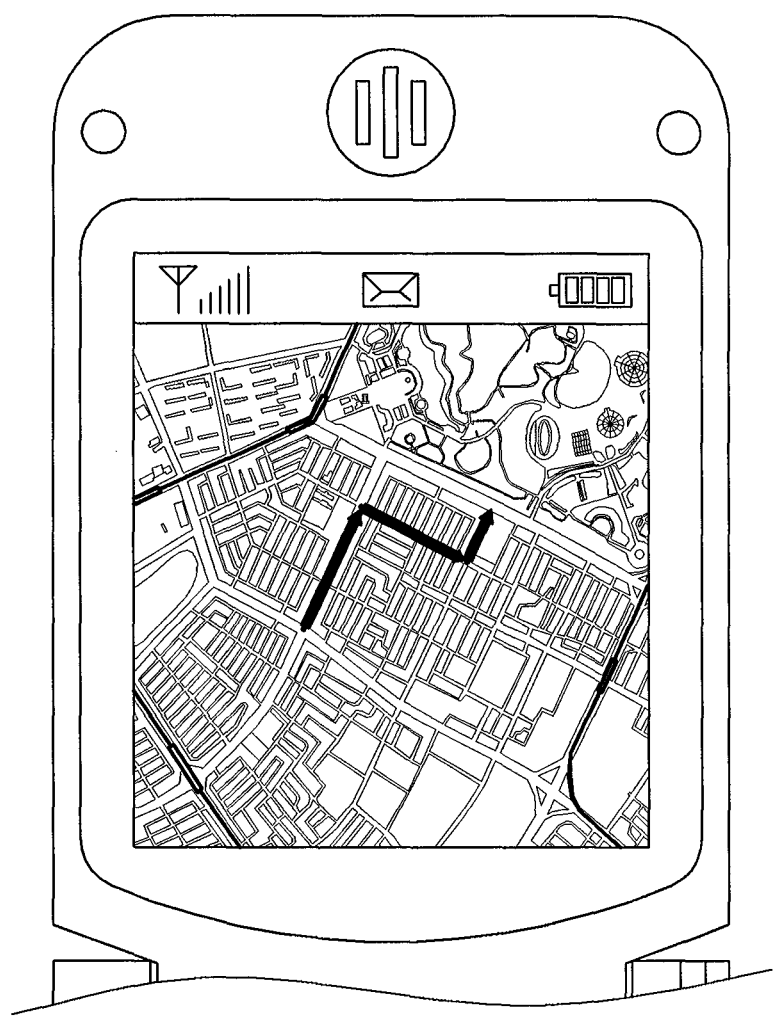
FIG. 3 illustrates an example of a friend location travel guide map that is provided from a system for providing friend location information according to an exemplary embodiment of the preset invention.

FIG. 3 illustrates an example of a friend location travel guide map that is provided from a system for providing friend location information according to an exemplary embodiment of the preset invention.

As shown in FIG. 3, when a friend appears in a region set by a user, the system according to the present exemplary embodiment may store corresponding location information of the friend. When the user desires to verify a travel route of the friend, the system may display on the map the travel route of the friend in the set region. In FIG. 3, the user receives information from the system via a mobile phone terminal. In this case, the image of the map is displayed and the travel route of the friend is marked using a red arrow.

As described above, the travel route of the friend may be displayed on the map using the arrow. Any type of scheme capable of indicating the travel route of the friend may be used, as long as the scheme enables the user to identify the travel route of the user in the selected region at a glance.

Figure 4:
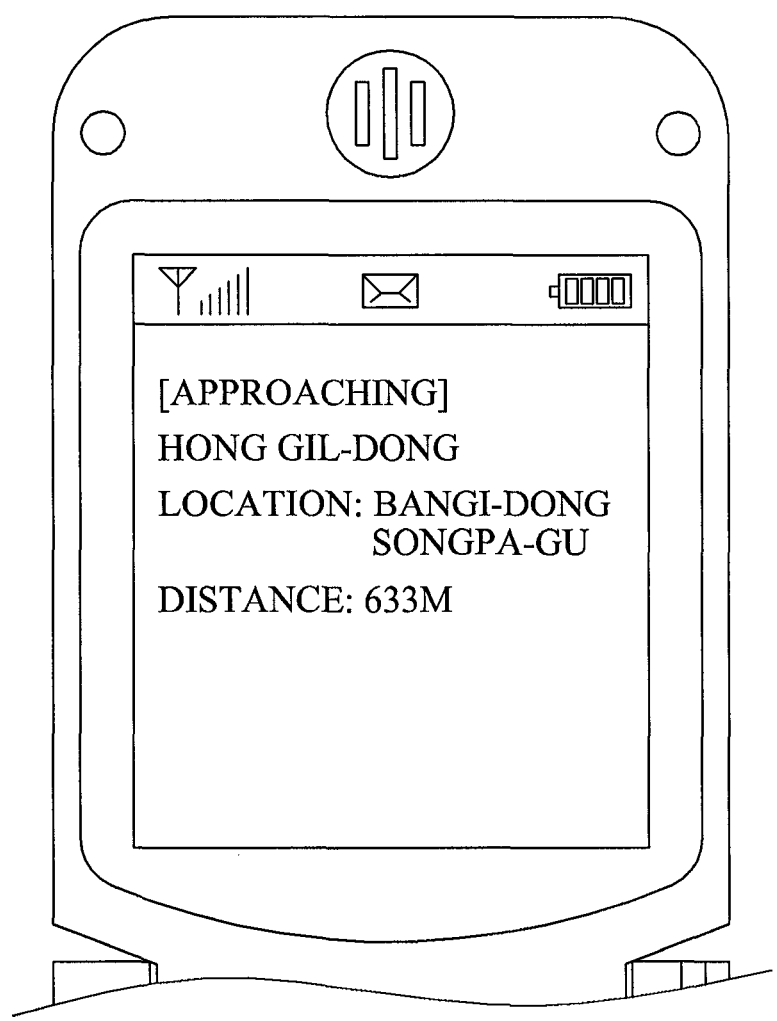
FIG. 4 illustrates an example of a notification for an approach of a friend that is provided from a system for providing friend location information according to an exemplary embodiment of the present invention.

FIG. 4 illustrates an example of a notification for an approach of a friend that is provided from a system for providing friend location information according to an exemplary embodiment of the present invention.

As shown in FIG. 4, when a distance between a friend and a user is within a predetermined distance, the system according to the present exemplary embodiment may inform the user of an approach of the friend. In this instance, the system may inform the user of the approach of the friend by transmitting an SMS message to a mobile phone of the user. A current distance between the friend and the user and a current location of the friend may be included in approach notification information. As shown in FIG. 4, when information about the approach of the friend is displayed for the user using the SMS message, the user may verify in real time whether the friend is approaching the user.

Figure 5:
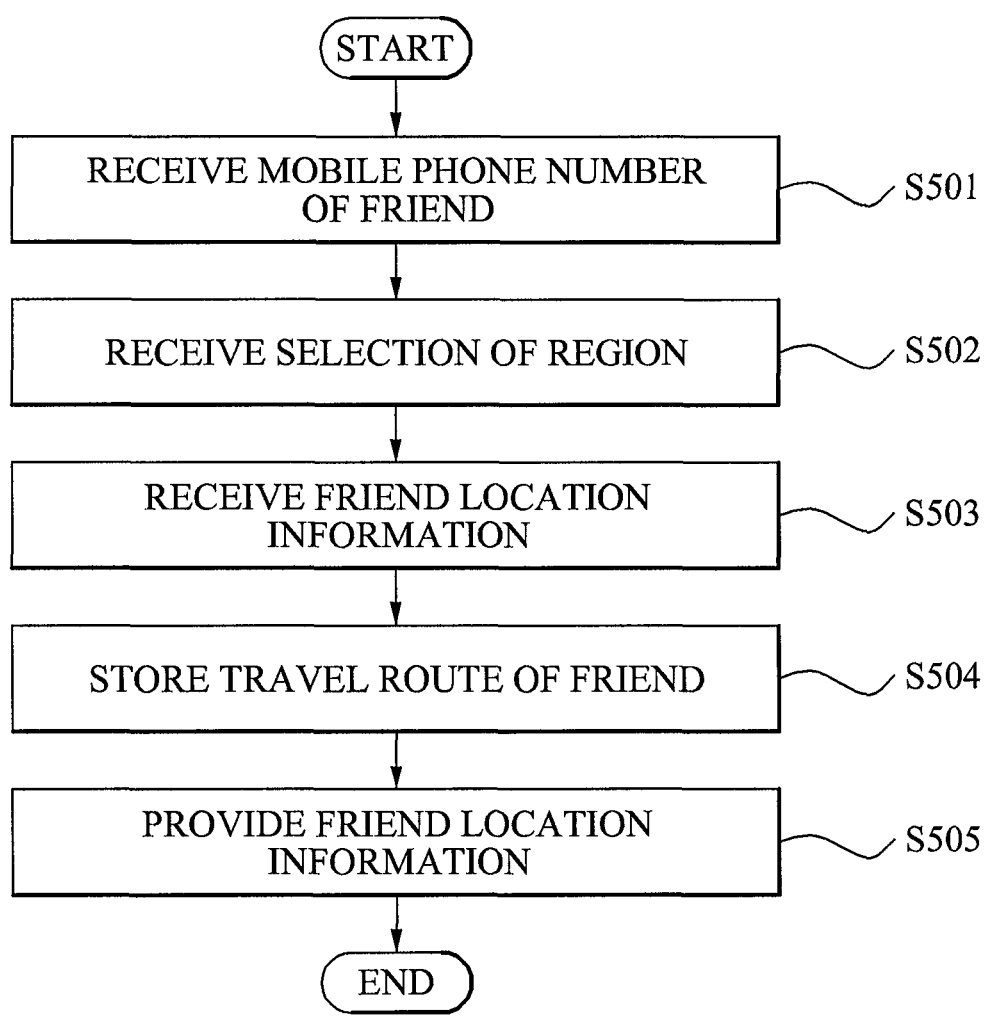
FIG. 5 is a flowchart illustrating a method of providing friend location information according to an exemplary embodiment of the present invention.

FIG. 5 is a flowchart illustrating a method of providing friend location information according to an exemplary embodiment of the present invention.

In operation S501, a mobile phone number of a friend is received from a user. The mobile phone number may be directly input from the user via a user terminal. Also, the mobile phone number may be input from the user by selecting a friend from friends that the user enrolled in the system 201 using an address book and the like. When the user directly selects and inputs the friend, an enrolled mobile phone number of the friend may be input as the mobile phone number of the friend. A location of the friend may be identified based on a location of the mobile phone of the friend. Therefore, the mobile phone number may be required to identify the location of the friend.

In operation S502, a selection of a region is received from the user to verify a travel route of the friend. The selected region may be any region which is included within a predetermined distance. In this instance, the user may input a name of the region and select the region from a provided list according to the name, or may select the region which the user is interested in while viewing a map and changing a view point of the map. Also, the user may select the region using various types of schemes. Any type of scheme enabling the user to select the region which the user is interested in may be applicable to the present invention.

In operation S503, location information of the friend is received based on the mobile phone number of the friend. The location information may be received from a separate location information providing server. Generally, the location of the mobile phone may be readily identified by the base station which transmits and receives data with the mobile phone. Therefore, the location information providing server may be a server of a mobile communication provider that operates the base station. Also, any type of scheme capable of identifying the location of the mobile phone and thereby enabling the user to identify a current location of the friend may be applicable to the present invention. In operation S503, location information of the friend is received and friend location information is provided to the user based on the received location information. Also, the friend location information received in operation S503 may include various types of information that helps the user to accurately identify the location of the friend.

In operation S504, when the location of the friend, received in operation S503, is included in the region selected in operation S502, the travel route of the friend in the selected region is stored in a database. The method of providing friend location information according to the present exemplary embodiment may enable the user to identify the travel route of the friend at a glance even though the user does not frequently verify the location of the friend using a mobile phone. In this instance, when the current location of the enrolled friend is displayed for the user and simply deleted, the service becomes unusable.

Accordingly, operation S504 is to store in the database location information of the friend enrolled by the user so that the user may later identify the travel route of the enrolled friend at a glance, when the user desires. The information received in operation S503 may be stored as the location information of the friend as is. Also, the received information may be processed to be stored as the location information of the friend.

In operation S505, a map of the region is provided to the user by referring to the database. The map of the region includes the travel route of the friend and the database stores location information of the friend. The map including the travel route of the friend may be displayed on a user terminal in a visually identifiable form.

In order to provide the user with the map that includes the travel route of the friend in operation S505, location information of the friend may be received from the database storing the same. The database stores information about locations where the friend was located in the region set by the user, and thus the user may verify which route the friend traveled along based on the information. Also, in order to enable the user to more readily verify the identified travel route of the friend, the travel route of the friend may be marked on the map of the selected region using an arrow and the like, and the marked map may be displayed for the user. As described above, when the user views the map marked by an arrow, the user may identify which route the friend traveled along at a glance.

Accordingly, in operation S505, a map image selected in operation S502 may be received and location information of the friend, which is extracted from the database, may be included in the received map image to thereby display the travel route of the friend. For the above operation, the map image may include location information corresponding to a location of an actual region. For example, information about the location of the actual region may be stored in each pixel of the image or a predetermined range of the image.

Also, in operation S505, current location information of the friend may be displayed for the user. In this instance, when displaying the map where the travel route of the friend is marked, the current location of the friend may be displayed on the map for the user. Also, in operation S505, an address of the current location of the friend may be display for the user in a form of a text message. When the current location information of the friend is provided in the form of the text message, the location information provider 250 may provide the current location information using an SMS message of the mobile phone terminal.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

According to the present invention, it is possible to provide a user with friend location information.

Also, according to the present invention, it is possible to enable a user to identify preferred places of a friend.

Also, according to the present invention, it is possible to provide a user with a map where a travel route of a friend is marked and thereby enable the user to identify the travel route of the friend at a glance.

Also, according to the present invention, it is possible to inform a user that a friend is approaching the user so that the user may verify the approach of the friend in real time.

Also, according to the present invention, it is possible to provide a user with a distance between the user and a friend so that the user may readily identify a location of the friend.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for providing friend location information, the system comprising:
    a friend information receiving unit configured to receive from a user a mobile phone number of a friend;
    a region selection unit configured to receive from the user a selection of a region to verify a travel route of the friend;
    a location information receiving unit configured to receive the friend location information based on the mobile phone number of the friend;
    a location information storage unit configured to store in a database the travel route of the friend in the region when a location of the friend is included in the region; and
    a location information provider configured to provide the user with a map of the region by referring to the database, wherein the map of the region includes the travel route of the friend,
    wherein the location information storage unit stores in the database the travel route of the friend in the region when the location of the friend is included in the region by verifying the location of the friend for each predetermined period,
    wherein the location information storage unit stores the travel route of the friend in the database only when the friend is in close proximity to the user or when the friend is becoming separated from the user.

2. The system of claim 1, wherein the location information provider provides the user with current location information of the friend.

3. The system of claim 1, wherein the location information receiving unit further comprises:
    a distance calculation unit configured to receive user location information and calculate a distance between the friend and the user by referring to the user location information and the friend location information.

4. The system of claim 3, wherein the location information provider provides the user with the calculated distance between the friend and the user.

5. The system of claim 3, further comprising:
    a setup receiving unit configured to receive from the user an approach notification setup,
    wherein the location information provider determines whether the calculated distance between the friend and the user is within a predetermined distance and informs the user of an approach of the friend when the approach notification setup is received.

6. The system of claim 5, wherein the location information provider transmits a short message service (SMS) message to a mobile phone of the user to inform that the friend is approaching the user.

7. The system of claim 3, further comprising:
    a setup receiving unit configured to receive from the user a separation notification setup,
    wherein the location information provider determines whether the calculated distance between the friend and the user is beyond a predetermined distance and informs the user of separation from the friend when the separation notification setup is received.

8. The system of claim 7, wherein the location information provider transmits an SMS message to a mobile phone of the user to inform that the friend is becoming separated from the user.

9. The system of claim 3, wherein the location information storage unit stores the travel route of the friend when the calculated distance between the friend and the user is within a predetermined distance.

10. The system of claim 3, wherein the location information storage unit stores in the database the travel route of the friend when the calculated distance between the friend and the user is beyond a predetermined distance.

11. The system of claim 1, wherein the predetermined period is input from the user.

12. A method of providing friend location information, the method comprising:
    receiving from a user a mobile phone number of a friend;
    receiving from the user a selection of a region to verify a travel route of the friend;
    receiving the friend location information based on the mobile phone number of the friend;
    storing in a database the travel route of the friend in the region when a location of the friend is included in the region; and
    providing the user with a map of the region by referring to the database wherein the map of the region includes the travel route of the friend, wherein the travel route of the friend in the region is stored in the database when the location of the friend is included in the region by verifying the location of the friend for each predetermined period, wherein the travel route of the friend in the region is stored only when the friend is in close proximity to the user or when the friend is becoming separated from the user.

13. The method of claim 12, further comprising:

providing the user with current location information of the friend.

14. A non-transitory computer-readable recording medium storing a program for implementing the method according to claims 12.

\* \* \* \* \*